(12) United States Patent
Broadbent et al.

(10) Patent No.: US 10,545,847 B2
(45) Date of Patent: Jan. 28, 2020

(54) GROUPING AND ISOLATING SOFTWARE CHANGES TO INCREASE BUILD QUALITY

(71) Applicant: INTERNATIONAL BUSINESS MACHINES CORPORATION, Armonk, NY (US)

(72) Inventors: Peter R. Broadbent, Bristol (GB); Roy Janssen, Weert (NL); Ramon L. H. Pisters, Weert (NL); Leendert P. Tange, Weert (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,873

(22) Filed: Sep. 15, 2016

(65) Prior Publication Data
US 2018/0074936 A1    Mar. 15, 2018

(51) Int. Cl.
*G06F 11/36*    (2006.01)
(52) U.S. Cl.
CPC .................. *G06F 11/3604* (2013.01)
(58) Field of Classification Search
CPC .................. G06F 11/3604; G06F 11/36
See application file for complete search history.

(56) References Cited

U.S. PATENT DOCUMENTS

| | | | |
|---|---|---|---|
| 7,131,112 B1 | 10/2006 | Bartz et al. | |
| 8,245,192 B1 | 8/2012 | Chen et al. | |
| 8,627,286 B2 | 1/2014 | Feigen | |
| 8,776,014 B2 | 7/2014 | Arnott et al. | |
| 2007/0083859 A1 | 4/2007 | Fussell et al. | |
| 2009/0144698 A1* | 6/2009 | Fanning | G06F 8/75 717/120 |
| 2009/0327000 A1 | 12/2009 | Davis et al. | |
| 2010/0050156 A1 | 2/2010 | Bonanno et al. | |
| 2010/0179927 A1 | 7/2010 | Meher et al. | |
| 2010/0242028 A1* | 9/2010 | Weigert | G06F 21/105 717/131 |
| 2014/0053135 A1 | 2/2014 | Bird et al. | |

(Continued)

OTHER PUBLICATIONS

Kim et al., "Discovering and Representing Systematic Code Changes," IEEE 31st International Conference on Software Engineering (ICSE), May 16-24, 2009, p. 1-11.

(Continued)

*Primary Examiner* — Wei Y Zhen
*Assistant Examiner* — Amir Soltanzadeh
(74) *Attorney, Agent, or Firm* — Michael O'Keefe (57) ABSTRACT

A method for assessing a quality of a plurality of changes to a plurality of source code is provided. The method may include receiving the plurality of source code for a software product, whereby the received plurality of source code includes the plurality of changes. The method may also include identifying at least one property associated with each of the plurality of changes within the received plurality of source code. The method may further include determining a confidence level for each of the plurality of changes based on the at least one identified property associated with each of the plurality of changes and a plurality of historical software build data. The method may also include assigning each of the plurality of changes to a build group based on the determined confidence level. The method may further include executing the build group in a software build.

18 Claims, 6 Drawing Sheets

(56) References Cited

U.S. PATENT DOCUMENTS

2014/0372989 A1* 12/2014 Shani ................. G06F 11/3688
717/131
2015/0052501 A1* 2/2015 Shani ....................... G06F 8/60
717/124

OTHER PUBLICATIONS

Mell et al., "The NIST Definition of Cloud Computing," National Institute of Standards and Technology, Sep. 2011, p. 1-3, Special Publication 800-145.

* cited by examiner

GROUPING AND ISOLATING SOFTWARE CHANGES TO INCREASE BUILD QUALITY

BACKGROUND

The present invention relates, generally, to the field of computing, and more particularly to software builds.

In software development, a software build relates to the observable, constructed result of converting source code into a standalone software file capable of being executed on a computer. Software building may be an end-to-end process with various functions, such as version control, compilation, and code analysis. During the software build process, build tools may be utilized to assist a user coordinate and control other programs implemented during the build, such as build utilities and linkers.

SUMMARY

According to one embodiment, a method for assessing a quality of a plurality of changes to a plurality of source code is provided. The method may include receiving the plurality of source code for a software product, whereby the received plurality of source code includes the plurality of changes. The method may also include identifying at least one property associated with each of the plurality of changes within the received plurality of source code. The method may further include determining a confidence level for each of the plurality of changes based on the at least one identified property associated with each of the plurality of changes and a plurality of historical software build data. The method may also include assigning each of the plurality of changes to a build group based on the determined confidence level. The method may further include executing the build group in a software build.

According to another embodiment, a computer system for assessing a quality of a plurality of changes to a plurality of source code is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the plurality of source code for a software product, whereby the received plurality of source code includes the plurality of changes. The method may also include identifying at least one property associated with each of the plurality of changes within the received plurality of source code. The method may further include determining a confidence level for each of the plurality of changes based on the at least one identified property associated with each of the plurality of changes and a plurality of historical software build data. The method may also include assigning each of the plurality of changes to a build group based on the determined confidence level. The method may further include executing the build group in a software build.

According to yet another embodiment, a computer program product for assessing a quality of a plurality of changes to a plurality of source code is provided. The computer program product may include one or more computer-readable storage devices and program instructions stored on at least one of the one or more tangible storage devices, the program instructions executable by a processor. The computer program product may include program instructions to receive the plurality of source code for a software product, whereby the received plurality of source code includes the plurality of changes. The computer program product may also include program instructions to identify at least one property associated with each of the plurality of changes within the received plurality of source code. The computer program product may further include program instructions to determine a confidence level for each of the plurality of changes based on the at least one identified property associated with each of the plurality of changes and a plurality of historical software build data. The computer program product may also include program instructions to assign each of the plurality of changes to a build group based on the determined confidence level. The computer program product may further include program instructions to execute the build group in a software build.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention are related to the field of computing, and more particularly to software builds. The following described exemplary embodiments provide a system, method, and program product to, among other things, utilize machine learning to assess the quality of a software build by comparing individual changes within a build to historical change data associated with previous software builds. Therefore, the present embodiment has the capacity to improve the technical field of software builds by efficiently predicting the likelihood each change within a software build has in passing all validation tests during the software delivery process (e.g. compiling and packaging) based on historical software build data.

As previously described, a software build relates to the observable, constructed result of converting source code into a standalone software file capable of being executed on a computer. Software building may be an end-to-end process with various functions, such as version control, compilation, and code analysis. During the software build process, build tools may be utilized to assist a user coordinate and control other programs implemented during the build, such as build utilities and linkers.

During software development, the build process is essential to provide a continuous delivery mechanism, especially when creating and delivering software within a cloud environment. To ensure quality and reliability of the build process, large quantities of resources may be consumed.

Since the build process may involve introducing changes to source code, testing each newly introduced change is crucial to the quality of the build. At many levels during the development cycle, validation is applied to ensure that changes do not compromise the existing functionality and that the resultant product executes as expected. However, many software builds institute numerous changes that have a combined impact on the final product that can be difficult to predict. For example, if a build has hundreds of changes and a single change causes an error during program execution, determining which change is the root cause of the program error may be difficult.

Isolating each change into a separate build may be a solution to identifying which change causes an error in a build. However, in builds with numerous changes, isolating each change into an independent build may be burdensome on time and resources. As such, it may be advantageous to, among other things, implement an approach that applies a change record and properties associated with each change to allow for changes to be grouped together into builds based on common characteristics, such as change confidence. Therefore, changes with a high confidence level of success may be grouped together in a single build and changes with a low confidence of success may be isolated into separate builds.

According to one embodiment, changes made to written source code may be grouped together in a manner that may allow the build system to operate more efficiently than testing a separate build for each individual source code change. The changes may be grouped together based on the properties of each individual change and a confidence level associated with each change. The confidence level may be determined based on the change properties and historical software build data. If no historical software build data is available, such as when a system is first created, then the confidence level may be determined by preconfigured rules, such as large changes to source code may be more likely to fail due to the complexity of such changes. In at least one embodiment, the confidence level may be calculated by a hybrid model of both preconfigured rules and historical software build data.

As more changes are made to the source code, historical software build data may accumulate and be stored within a data repository to assist in the determination of the build confidence for subsequent changes to the source code. The build confidence may be a numerical value that represents the expected quality of a build (i.e. the resulting product) as calculated by analyzing the build results and the validation results. For example, if all parts of a build succeeded during testing, then a high confidence level may be assigned to the build. Additionally, the build confidence of previous changes may be utilized when calculating the build confidence for subsequent, similar source code changes. For example, if a change to the source code is substantially similar to a previous source code change that received a high build confidence, the new change may also receive a high build confidence. Furthermore, by utilizing statistical analysis of the historical software build data, properties that are strong indicators of build confidence may be determined. For example, if a specific change property is present in several changes that receive a low build confidence, the presence of the specific change property in subsequent changes may lower the build confidence of the subsequent changes.

Using historical software build data and/or preconfigured rules, changes with a high build confidence within a build may be grouped and analyzed together since changes with a high build confidence are likely to pass testing. Conversely, changes with a low confidence may be isolated and tested in separate builds, since such changes may not pass testing and require an in-depth user analysis in order to detect the cause of a testing failure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine the build confidence of source code changes based on historical software build data and group and test the source code changes with a high build confidence together while isolating the source code changes with a low build confidence.

Figure 1:
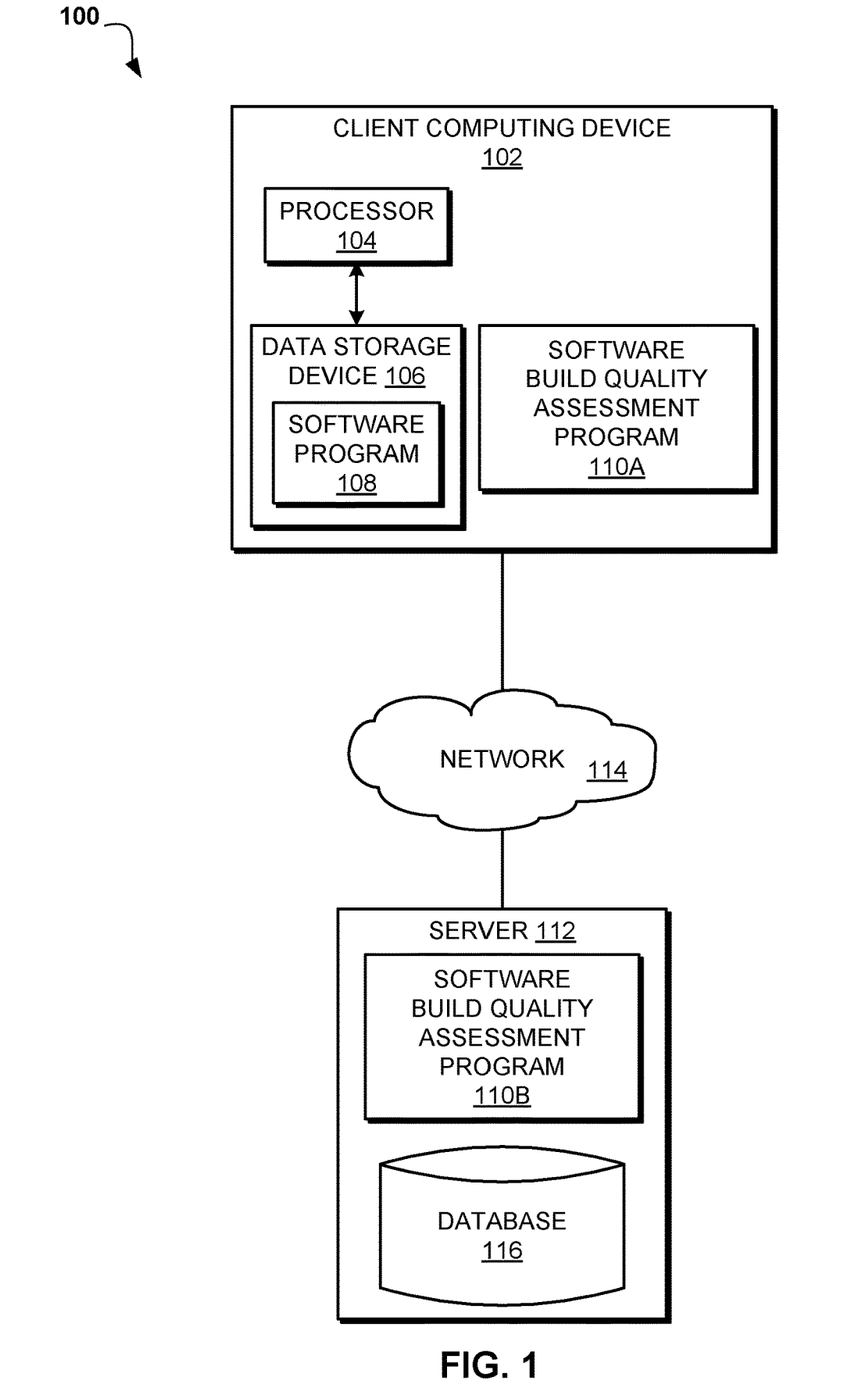
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and a software build quality assessment program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402*a* and external components 404*a*, respectively.

The server computer 112 may be a laptop computer, netbook computer, personal computer (PC), a desktop computer, or any programmable electronic device or any network of programmable electronic devices capable of hosting and running a software build quality assessment program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the software build quality assessment program 110A, 110B may be a program capable of grouping individual changes to software source code together into a single build based on the confidence level of success associated with each change and testing the single build of grouped changes. Furthermore, the software build quality assessment program 110A, 110B may create a separate build for each source code change with a low confidence level. Additionally, the software build quality assessment program 110A, 110B may store historical software build data, such as the confidence level associated with a specific source code change, in a data repository, such as database 116, to assist in determining the confidence level associated with a specific source code change and grouping together the source code changes. The software build quality assessment method is explained in further detail below with respect to FIG. 2.

Figure 2:
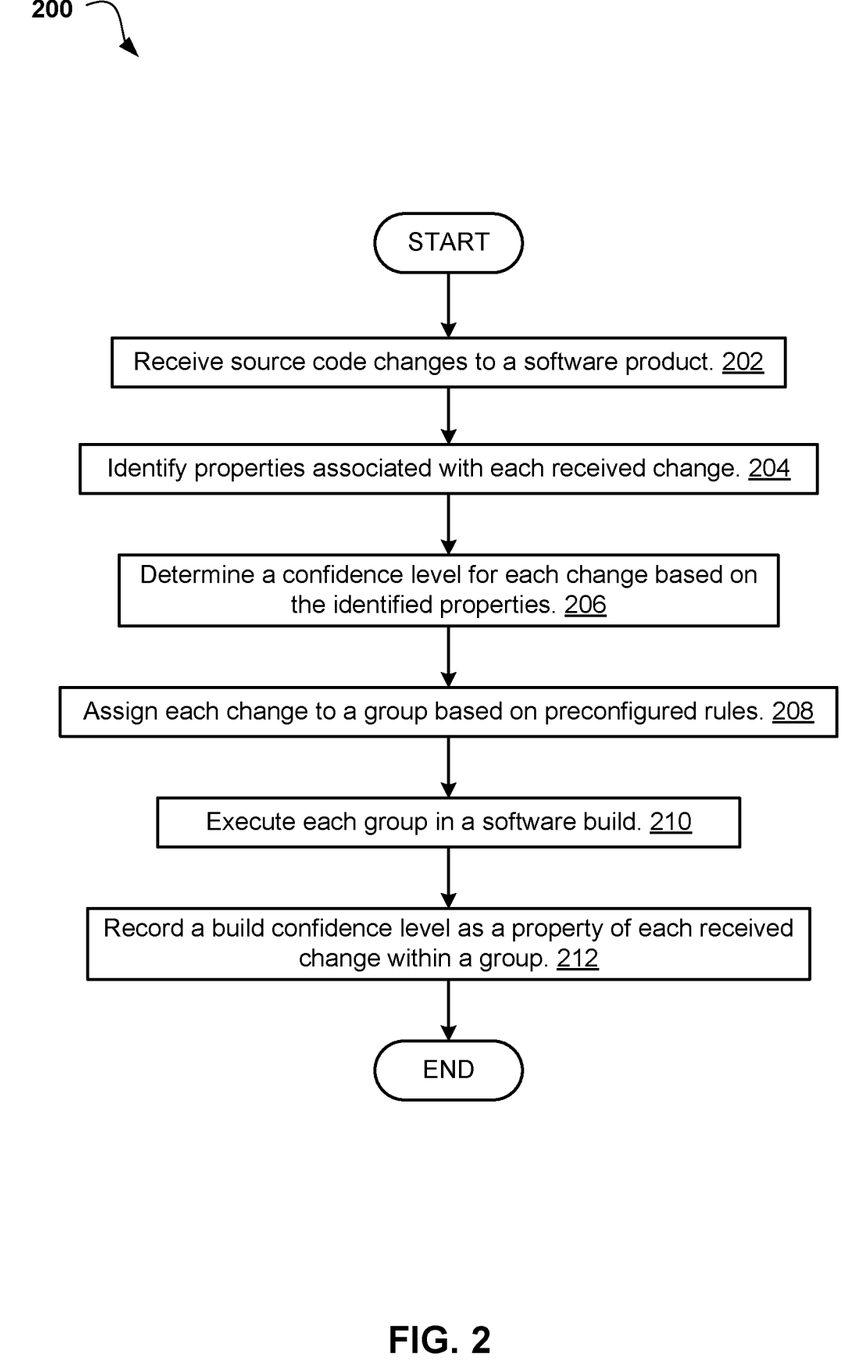
FIG. 2 is an operational flowchart illustrating a software build quality assessment process according to at least one embodiment.

Referring now to FIG. 2, an operational flowchart illustrating a software build quality assessment process 200 is depicted, according to at least one embodiment. At 202, the software build quality assessment program 110A, 110B receives source code changes to a software product, such as software program 108. A user, such as a developer or a programmer, may regularly make changes to the source code of the software program 108. The changes made by the user may include the addition or deletion of one or more lines of source code. Whenever a change is made to the source code, the software build quality assessment program 110A, 110B may receive the entire file containing the source code and identify the developer changes that are in need of testing. For example, the software build quality assessment program 110A, 110B may receive a file containing the source code for a program, such as software program 108, and identify 20 changes have been made to the source code by a user. Furthermore, once each change is identified, the software build quality assessment program 110A, 110B may store each identified change within a repository, such as database 116.

Then, at 204, the software build quality assessment program 110A, 110B identifies properties associated with each received change. In order to determine the affect each identified change has on the software build, the software build quality assessment program 110A, 110B may identify properties associated with each received change, such as change size (e.g. number of lines and number of locations), change author, reviewer name, change type (e.g. feature or defect), check-in date, check-in time, and parts or sub-parts of the source code affected by the changes. Similar to the identified changes, the software build quality assessment program 110A, 110B may store the identified properties in a repository, such as database 116. Additionally, the software build quality assessment program 110A, 110B may store the association between a specific change and a property within the repository.

Next, at 206, the software build quality assessment program 110A, 110B determines a confidence level for each change based on the identified properties. The confidence level may be a number that expresses the expected quality of the version of a product that has been built. The higher confidence level value for a particular change may be associated with the likelihood a change is to succeed validation during the software delivery process. For example, if confidence level is measured on a numerical scale from 0 to 100 and a particular build has a high quality level, the confidence level associated with the build may be greater than 80. The confidence level may be calculated by performing known statistical analysis tests on the build. The known statistical analysis tests may analyze changes and properties associated with those changes stored within the repository in order to determine the confidence level of a particular change. Statistical analysis may determine to what degree specific change properties influence build confidence, either positively or negatively. For example, changes that are checked in at the end of a work session may be less reliable than early work day changes due to user fatigue. Similarly, changes that have not been reviewed by another user may prove to be less reliable than changes that have received a review. Furthermore, when a program is new with little historical software build data (i.e. any data that aids in a determination of success during the software delivery process), the software build quality assessment program 110A, 110B may determine the confidence level based on rules preconfigured by a user. For example, a rule may be established to assign a low confidence level to a large change to the source code. In an alternate embodiment, the confidence level may be calculated by a hybrid model of both preconfigured rules and historical software build data.

The confidence level may be affected by the specific properties of each change. For example, a program may have frequent source code changes and continuous build updates submitted by a user. Since testing the frequent build updates may be burdensome on time and resources, the user may determine a track record should be created in order to record specific properties of subsequent builds, such as build author, change size, date and time of the change, reviewer, and change type (e.g. new feature added or defect fix). Once sufficient changes and corresponding properties have been recorded within a database 116, the software build quality assessment program 110A, 110B may calculate an average confidence for each change type using known statistical analysis. For example, the software build quality assessment program 110A, 110B may determine a new feature added needs an average confidence source of 86 out of a possible 100 while a defect fix would need an average confidence level of 45 out of 100. Therefore, the change type may be a significant factor that contributes towards build confidence and the rules that calculate the confidence level factor the change type into the confidence level calculation.

Change size may also contribute to the final value of the confidence level. For example, if the change size exceeds a preconfigured change size threshold (i.e. changes to 100 lines of code or 10% of the code has been changed), the software build quality assessment program 110A, 110B may decrease the confidence level by a value of 5 since large changes may have a negative effect on the confidence level.

Then, at 208, the software build quality assessment program 110A, 110B assigns each change to a group based on preconfigured rules. The software build quality assessment program 110A, 110B may attempt to group changes together into as few builds as possible in order to conserve resources, such as time and processing power. However, the software build quality assessment program 110A, 110B may only group a number of changes with a high confidence level together. Changes with a low confidence level may be isolated from other changes, including other changes with low confidence, and tested separately, since such changes may be likely to create a program error. By isolating changes with a low confidence level into individual builds, the software build quality assessment program 110A, 110B may allow for easier identification of the changes that are the root cause of a build breakage.

In at least one embodiment, the preconfigured rules may base the grouping on the properties known to have the most positive and most negative influence on the software build. Such grouping logic may only be utilized when sufficient historical software build data is stored within the database 116. Additionally, if insufficient historical software build data is available, the software build quality assessment program 110A, 110B may apply simple logic rules based on the meaning of properties. For example, large changes to the source code may be more likely to fail than small changes to the source code. Additionally, change confidence may be only one factor accounted for when grouping changes. For example, the software build quality assessment program 110A, 110B may also account for environmental inputs, such as number of current changes and build duration, so that the determination of which changes to group together becomes even more dynamic.

Next, at 210, the software build quality assessment program 110A, 110B executes each group in a software build. Once the software build quality assessment program 110A, 110B has grouped each change together into an appropriate build, each build may be executed to determine success and the overall build quality of each build. If a build fails, the user may be able to analyze the build to determine which change was the root cause of the build failure. For example, if an isolated low confidence change failed, the user may be able to immediately proceed to determine what caused the build to fail within that change rather than reviewing multiple changes within the build. In at least one embodiment, if a build that includes a group of changes fails, the software build quality assessment program 110A, 110B may be able to isolate each change within the failed build into separate builds themselves. Thereafter, the software build quality assessment program 110A, 110B may execute each individual build to determine which change caused the grouped build to fail.

Then, at 212, the software build quality assessment program 110A, 110B records a build confidence level as a property of each received change within a group. As a means of continuously monitoring changes, the properties associated with the changes, and the resulting build confidence level, the software build quality assessment program 110A, 110B may calculate a confidence level for each grouped build and each isolated build that is successfully executed and store each confidence level within the database 116 in order to dynamically adapt to new user changes to the source code. For example, a user that initially causes a number of program errors in a build due to inexperience may improve productivity and cause fewer errors as experience is gained over time. Therefore, through ongoing analysis, the software build quality assessment program 110A, 110B may increase the confidence level of changes associated with such a user by determining changes attributed to the user have become more successful.

Analyzing a historical change track record and statistical information may provide more insight into builds and what factors influence build quality positively and negatively. Such analysis may improve overall build quality. For example, failure to have changes reviewed may be the greatest cause of errors, so a user always has another user review source code changes. Such a modification to the review procedures may eventually have a positive direct influence on the recorded track record stored within the historical software build data and restructure the groupings of changes in builds.

Figure 3:
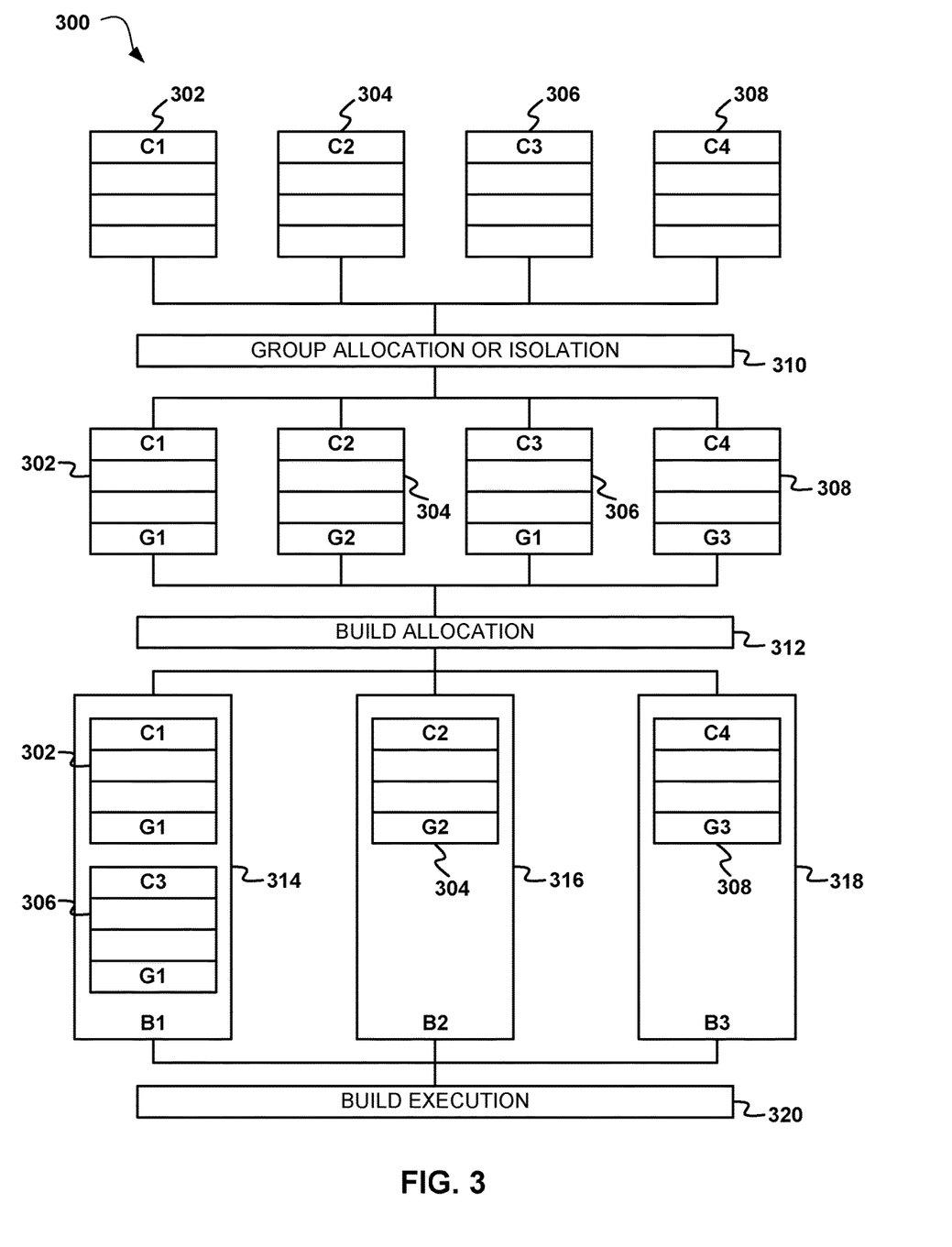
FIG. 3 is a functional block diagram of a software build quality assessment process according to at least one embodiment.

Referring now to FIG. 3, a functional block diagram of a software build quality assessment process 300 is depicted, according to at least one embodiment. When the software build quality assessment program 110A, 110B receives software source code from a user, the software build quality assessment program 110A, 110B may identify changes 302-308 within the received source code. At 310, the software build quality assessment program 110A, 110B may allocate each change 302-308 to a group or isolate each change 302-308 based on a confidence level associated with each change 302-308 and the historical software build data, such as amount of source code changed or previous impact of similar changes. The software build quality assessment program 110A, 110B may group together changes 302-308 with a high confidence level. For example, change C1 302 and change C3 306 may be grouped together in group G1 if the confidence level of each satisfies a user preconfigured grouping threshold, such as grouping together changes 302-308 with a confidence level exceeding 70 into a single build and testing the changes 302-308 as a whole rather than individually. Conversely, change C2 304 and change C4 308 may be isolated into group G2 and group G3, respectively, if the confidence level associated with each change satisfies a user preconfigured isolation threshold. For example, any change (e.g. 304) with a confidence level below 40 may be isolated into a separate build (e.g. 316) from other changes (e.g. 302, 306, and 308). Then, at 312, the software build quality assessment program 110A, 110B may create a software build 314-318 for each group of changes and for each isolated change and allocate each group to a build (e.g. 314). For example, if change C1 302 and change C3 306 were grouped together in group G1, software build B1 314 may be created to contain the grouped changes. Similarly, isolated change C2 304 in group G2 and isolated change C4 308 in group G3 may be placed in software build B2 316 and software build B3 318, respectively. Next, at 320, the software build quality assessment program 110A, 110B may execute each build 314-318 in order to test build functionality. If a build (e.g. 316) fails the testing, the software build quality assessment program 110A, 110B may allow a user to analyze the failed build (e.g. 316) to determine the root cause of the test failure. For example, if software build B2 316 fails, the user may determine that a program error exists within change C2 304 and further analysis may be required to fix the error. Similarly, if software build B1 314 fails testing, the user may determine change C1 302 or change C3 306 has failed. In order to determine more specifically which change in software build B1 314 failed, the user may manually inspect each change or configure the software build quality assessment program 110A, 110B to isolate each change within software build B1 314, create a separate build (e.g. 314) for each isolated change, and test each newly created build (e.g. 314).

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
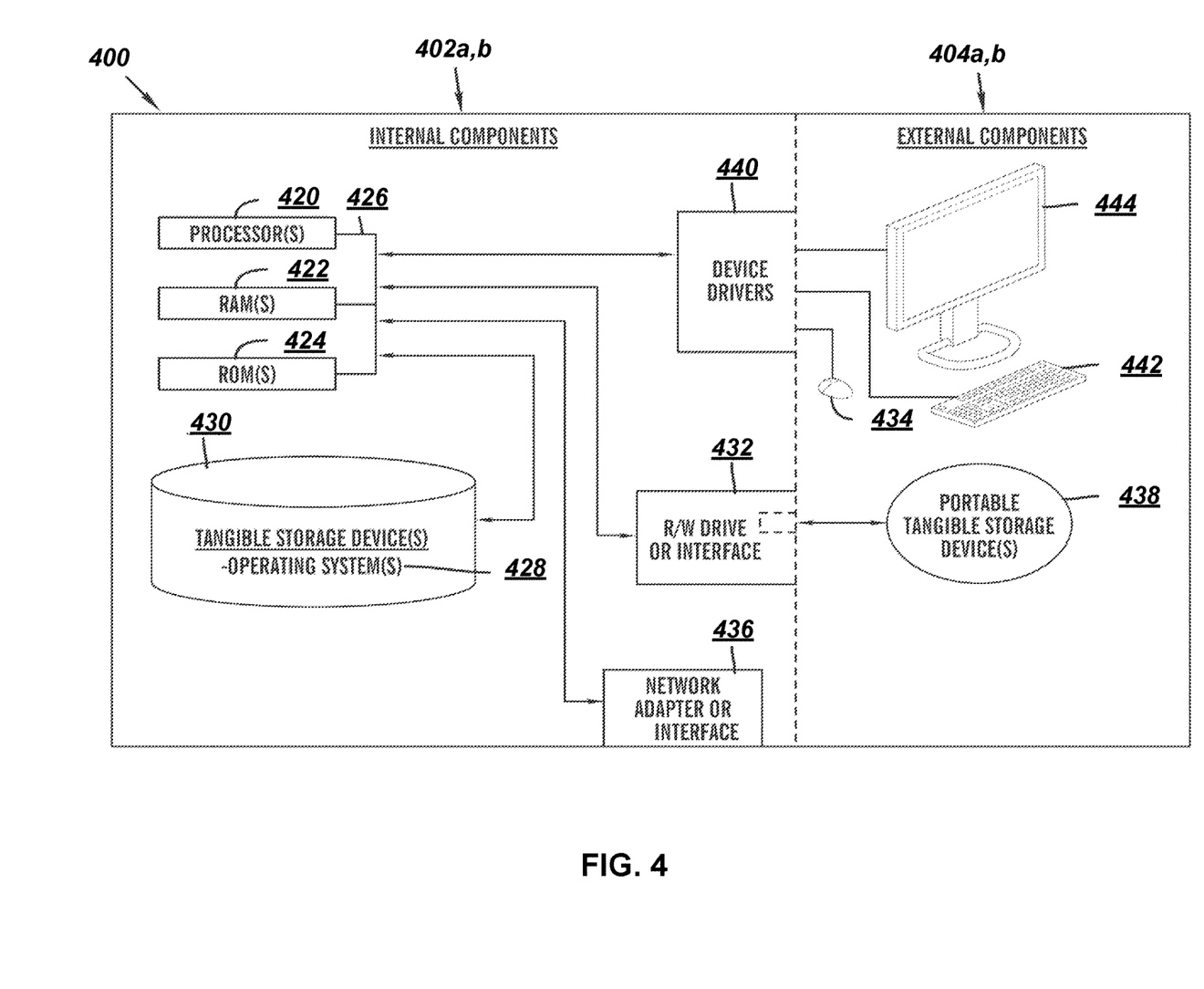
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the software build quality assessment program 110A in the client computing device 102, and the software build quality assessment program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the software build quality assessment program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the software build quality assessment program 110A in the client computing device 102 and the software build quality assessment program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the software build quality assessment program 110A in the client computing device 102 and the software build quality assessment program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
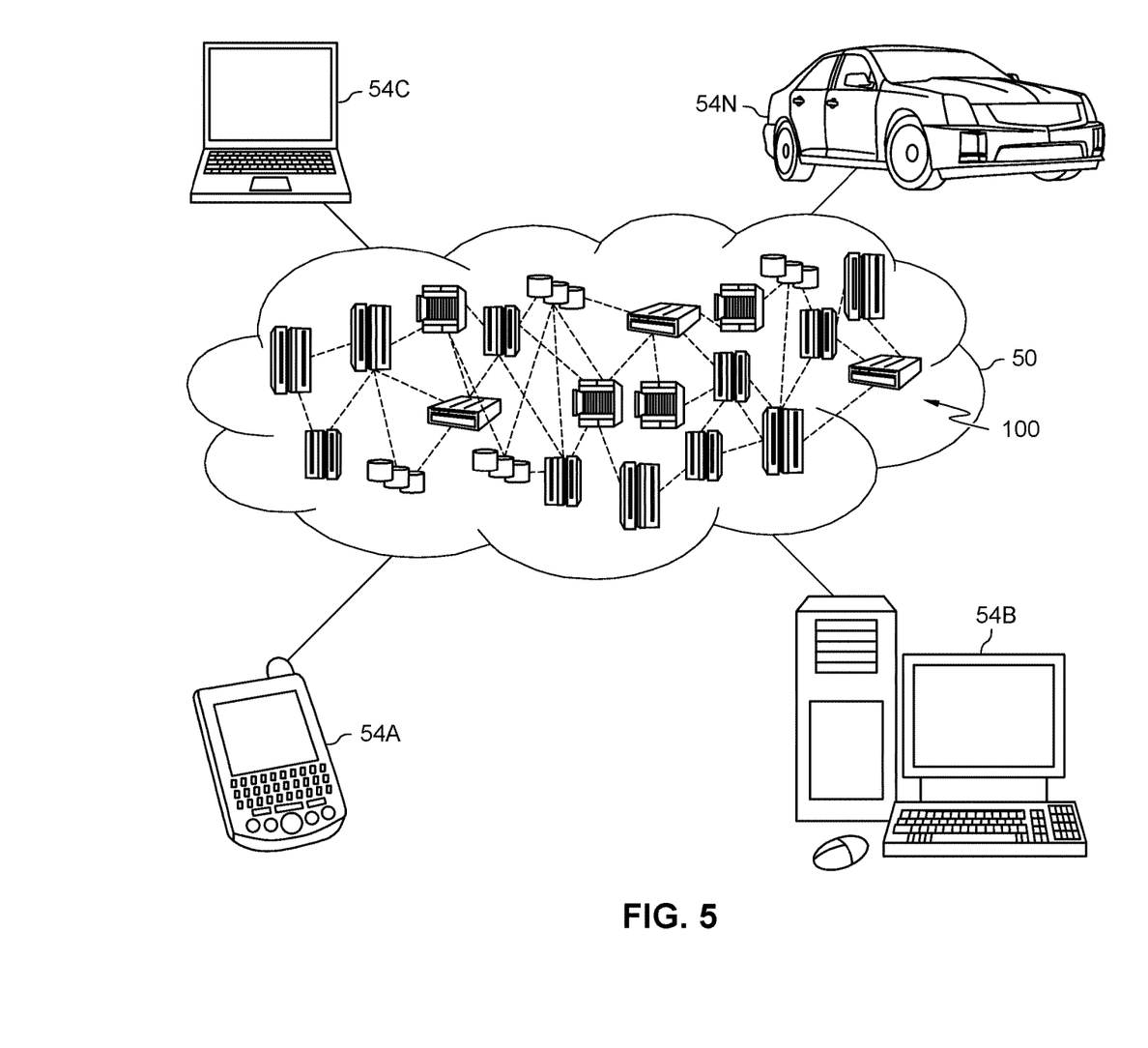
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
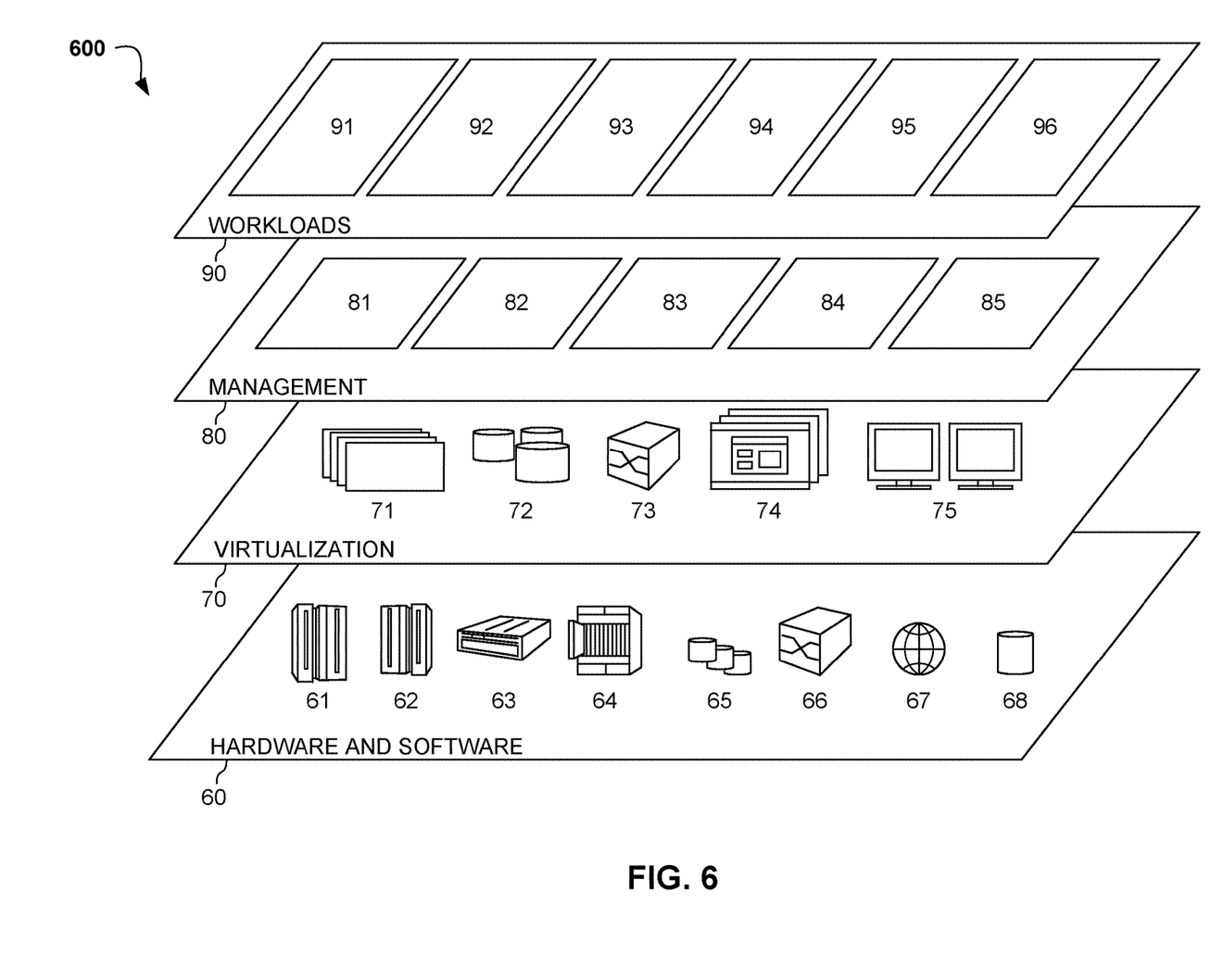
FIG. 6 depicts abstraction model layers according to an embodiment of the present invention.

Referring now to FIG. 6 a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assessing software build quality 96. Assessing software build quality 96 may relate to using historical software build data to determine a confidence level of success associated with a source code change, grouping changes with high confidence levels together while isolating changes with low confidence levels, and testing each group of changes and each isolated change as separate builds to identify possible program errors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for assessing a quality of a plurality of changes to a plurality of source code, the method comprising:

receiving, by a processor, the plurality of source code for a software product, wherein the received plurality of source code includes the plurality of changes;

identifying a plurality of properties associated with each of the plurality of changes within the received plurality of source code;

determining a confidence level for each of the plurality of changes based on the plurality of identified properties associated with each of the plurality of changes and a plurality of historical software build data;

grouping together each of the plurality of changes to one of a plurality of build groups based on the determined confidence level, identified properties known to have a positive influence on a build quality, identified properties known to have a negative impact on the build quality, and environment inputs, wherein assigning each of the plurality of changes to the build group includes isolating a change within the plurality of changes where the determined confidence level for the change falls below a user preconfigured isolation threshold, wherein the environmental inputs comprise a number of current changes and a build duration, wherein the positive influence and negative impact on the build quality is determined based on historical software build data of properties similar to the identified properties;

executing, simultaneously, a validation test of each build group of changes in a software build;

in response to a validation test of a build group failing, isolating each source code change into individual build groups; and executing a validation test of each individual build group.

2. The method of claim 1, wherein assigning each of the plurality of changes further comprises:

assigning each of the plurality of changes to the build group based on a plurality of preconfigured rules.

3. The method of claim 1, wherein the plurality of properties comprises a change size, a change author, a reviewer name, a change type, a check-in date, a check-in time, and a plurality of parts of the received plurality of source code affected by the plurality of changes.

4. The method of claim 1, wherein the plurality of historical software build data is selected from a group consisting of a plurality of previous changes and a plurality of properties associated with the plurality of previous changes.

5. The method of claim 1, further comprising:

recording each of the plurality of changes, the plurality of properties, and the determined confidence level in a data repository to be included with the plurality of historical software build data.

6. The method of claim 1, wherein assigning each of the plurality of changes to the build group includes grouping together at least one change within the plurality of changes where the determined confidence level for each at least one change satisfies a user preconfigured grouping threshold.

7. A computer system for assessing a quality of a plurality of changes to a plurality of source code, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving the plurality of source code for a software product, wherein the received plurality of source code includes the plurality of changes;

identifying a plurality of properties associated with each of the plurality of changes within the received plurality of source code;

determining a confidence level for each of the plurality of changes based on the plurality of identified properties associated with each of the plurality of changes and a plurality of historical software build data;

grouping together each of the plurality of changes to one of a plurality of build groups based on the determined confidence level, identified properties known to have a positive influence on a build quality, identified properties known to have a negative impact on the build quality, and environment inputs, wherein assigning each of the plurality of changes to the build group includes isolating a change within the plurality of changes where the determined confidence level for the change falls below a user preconfigured isolation threshold, wherein the environmental inputs comprise a number of current changes and a build duration, wherein the positive influence and negative impact on the build quality is determined based on historical software build data of properties similar to the identified properties;

executing, simultaneously, a validation test of each build group of changes in a software build;

in response to a validation test of a build group failing, isolating each source code change into individual build groups; and executing a validation test of each individual build group.

8. The computer system of claim 7, wherein assigning each of the plurality of changes further comprises:

assigning each of the plurality of changes to the build group based on a plurality of preconfigured rules.

9. The computer system of claim 7, wherein the plurality of properties comprises a change size, a change author, a reviewer name, a change type, a check-in date, a check-in time, and a plurality of parts of the received plurality of source code affected by the plurality of changes.

10. The computer system of claim 7, wherein the plurality of historical software build data is selected from a group consisting of a plurality of previous changes and a plurality of properties associated with the plurality of previous changes.

11. The computer system of claim 7, further comprising:

recording each of the plurality of changes, the plurality of properties, and the determined confidence level in a data repository to be included with the plurality of historical software build data.

12. The computer system of claim 7, wherein assigning each of the plurality of changes to the build group includes grouping together at least one change within the plurality of changes where the determined confidence level for each at least one change satisfies a user preconfigured grouping threshold.

13. A computer program product for assessing a quality of a plurality of changes to a plurality of source code, the computer program product comprising:
- one or more computer-readable storage medium and program instructions stored on at least one of the one or more storage medium, the program instructions executable by a processor, the program instructions comprising:
- program instructions to receive the plurality of source code for a software product, wherein the received plurality of source code includes the plurality of changes;
- program instructions to identify a plurality of properties associated with each of the plurality of changes within the received plurality of source code;
- program instructions to determine a confidence level for each of the plurality of changes based on the plurality of identified properties associated with each of the plurality of changes and a plurality of historical software build data;
- program instructions to group together each of the plurality of changes to one of a plurality of build groups based on the determined confidence level, identified properties known to have a positive influence on a build quality, identified properties known to have a negative impact on the build quality, and environment inputs, wherein assigning each of the plurality of changes to the build group includes isolating a change within the plurality of changes where the determined confidence level for the change falls below a user preconfigured isolation threshold, wherein the environmental inputs comprise a number of current changes and a build duration, wherein the positive influence and negative impact on the build quality is determined based on historical software build data of properties similar to the identified properties;
- program instructions to execute, simultaneously, a validation test of each build group of changes in a software build;
- in response to a validation test of a build group failing, program instructions to isolate each source code change into individual build groups; and
- program instructions to execute a validation test of each individual build group.

14. The computer program product of claim 13, wherein assigning each of the plurality of changes further comprises:
- program instructions to assign each of the plurality of changes to the build group based on a plurality of preconfigured rules.

15. The computer program product of claim 13, wherein the plurality of properties comprises a change size, a change author, a reviewer name, a change type, a check-in date, a check-in time, and a plurality of parts of the received plurality of source code affected by the plurality of changes.

16. The computer program product of claim 13, wherein the plurality of historical software build data is selected from a group consisting of a plurality of previous changes and a plurality of properties associated with the plurality of previous changes.

17. The computer program product of claim 13, further comprising:
- program instructions to record each of the plurality of changes, the plurality of properties, and the determined confidence level in a data repository to be included with the plurality of historical software build data.

18. The computer program product of claim 13, wherein assigning each of the plurality of changes to the build group includes grouping together at least one change within the plurality of changes where the determined confidence level for each at least one change satisfies a user preconfigured grouping threshold.

* * * * *